US010931927B2

(12) United States Patent
Davidson et al.

(10) Patent No.: US 10,931,927 B2
(45) Date of Patent: Feb. 23, 2021

(54) METHOD AND SYSTEM FOR RE-PROJECTION FOR MULTIPLE-VIEW DISPLAYS

(71) Applicants: Alan L. Davidson, Sherman Oaks, CA (US); Parag Havaldar, Cerritos, CA (US); Peter H. Palombi, Los Angeles, CA (US)

(72) Inventors: Alan L. Davidson, Sherman Oaks, CA (US); Parag Havaldar, Cerritos, CA (US); Peter H. Palombi, Los Angeles, CA (US)

(73) Assignees: Sony Pictures Technologies Inc., Culver City, CA (US); Sony Corporation, Tokyo (JP)

( * ) Notice: Subject to any disclaimer, the term of this patent is extended or adjusted under 35 U.S.C. 154(b) by 0 days.

(21) Appl. No.: 13/755,932

(22) Filed: Jan. 31, 2013

(65) Prior Publication Data

US 2014/0210810 A1    Jul. 31, 2014

(51) Int. Cl.
*G06T 15/00* (2011.01)
*H04N 13/111* (2018.01)
*H04N 13/275* (2018.01)

(52) U.S. Cl.
CPC ......... *H04N 13/111* (2018.05); *H04N 13/275* (2018.05)

(58) Field of Classification Search
CPC . H04N 13/0011; H04N 13/00; H04N 13/0275
USPC ...... 345/419, 427, 522; 348/46, 56; 382/154
See application file for complete search history.

(56) References Cited

U.S. PATENT DOCUMENTS

| 8,502,862 | B2 * | 8/2013 | Turner et al. ................... 348/46 |
| 8,773,449 | B2 * | 7/2014 | Hoover et al. ................. 345/522 |
| 8,860,716 | B2 * | 10/2014 | Kim et al. ..................... 345/419 |
| 8,884,948 | B2 * | 11/2014 | Turner ................. H04N 13/026 345/419 |
| 8,947,422 | B2 * | 2/2015 | Turner ................. H04N 13/026 345/419 |
| 9,042,636 | B2 * | 5/2015 | Turner ................. H04N 13/026 382/103 |
| 9,105,117 | B2 * | 8/2015 | Asente .................... G06T 15/00 |
| 9,342,914 | B2 * | 5/2016 | Turner ................. H04N 13/026 |

(Continued)

OTHER PUBLICATIONS

Kamencay, P., Breznan, M., Jarina, R., Lukac, P. and Zachariasova, M., 2012. Improved Depth Map Estimation from Stereo Images Based on Hybrid Method. Radioengineering, 21(1).*

(Continued)

*Primary Examiner* — Phu K Nguyen
(74) *Attorney, Agent, or Firm* — Mayer & Williams, PC; Stuart H. Mayer

(57) ABSTRACT

Systems and methods are provided that allow for the rapid creation of multiple novel views for applications. These multiple views may allow for not only stereo views but also for different viewpoints of a stereographic scene to be presented, or for a time progression of the stereo scene to be presented, where a viewpoint is altered with respect to time. The systems and methods may be employed to create the content for auto-stereographic displays or multiple view systems that use a plurality of novel views to display stereo media. Such displays or multiple view systems may include those employing parallax barriers or lenticular lenses.

21 Claims, 10 Drawing Sheets

(56) References Cited

U.S. PATENT DOCUMENTS

| | | | |
|---|---|---|---|
| 9,366,862 B2* | 6/2016 | Haddick | G02B 27/0093 |
| 9,465,444 B1* | 10/2016 | Ramaswamy | G06F 3/017 |
| 9,485,495 B2* | 11/2016 | Atanassov | H04N 13/0239 |
| 2008/0309756 A1 | 12/2008 | Verburgh et al. | |
| 2011/0157159 A1 | 6/2011 | Chen et al. | |
| 2011/0298898 A1 | 12/2011 | Jung et al. | |

OTHER PUBLICATIONS

Basu et al; Visualization-Determining Depth From Stereo; 2002; pp. 1-37.*

Lei, J., Wang, M., Wang, B., Fan, K. and Hou, C., 2014. Projection-based disparity control for toed-in multiview images. Optics Express, 22(9), pp. 11192-11204.*

Zhang L, Tam Wj. Stereoscopic image generation based on depth images for 3D TV. IEEE Transactions on broadcasting. Jun. 2005;51(2):191-9.*

Huang Ys, Cheng Fh, Liang Yh. Creating depth map from 2D scene classification. In2008 3rd International Conference on Innovative Computing Information and Control Jun. 18, 2008 (pp. 69-69). IEEE.*

Battiato S, Curti S, La Cascia M, Tortora M, Scordato E. Depth map generation by image classification. InThree-Dimensional Image Capture and Applications VI Apr. 16, 2004 (vol. 5302, pp. 95-105). International Society for Optics and Photonics.*

UM3DLab, Create Depth Maps—Photoshop, 2011, https://www.youtube.com/watch?v=HVSf22VT1t4.*

Tsukuba, Cvlab-Home: New Tsukuba Stereo Dataset, Feb. 14, 2012, pp. 1-5. https://www.youtube.com/watch?time_continue=14&v=0rEZcokuQfg.*

Neil A. Dodgson, "multi-view autostereoscopic 3D display" Stanford Workshop on 3D imaging, Jan. 27-28, 2011, 42 pages.

Converting Stereo 3D to MultiView (N-view) 3D. Jun. 7, 2011. http://autostereoscopic-3d.blogspot.in/2011/06/converting-stereo-3d-to-multiview-n.html. 2 pages.

Smolic, A., Content Creation for Stereoscopic 3D and Beyond. May 16-18, 2011. http://ieeexplore.ieee.org/xpl/articleDetails.jsp?tp=&arnumber=5877148&contentType=Conference+Publications&queryText%3DContent+crestion+for+Autostereoscopic+display. 1 page.

* cited by examiner

FIG. 9

METHOD AND SYSTEM FOR RE-PROJECTION FOR MULTIPLE-VIEW DISPLAYS

BACKGROUND

Movies presented in 3D are enjoying tremendous popularity. One way of achieving three-dimensional images is by way of stereography. In stereography two images are captured and presented to a user, one from a left camera and for the left eye of a viewer, and one from a right camera and for the right eye of a viewer. Stereography is one of the oldest ways of producing a 3D image for a viewer.

Recent advances in 3D video include the attempted use of lenticular displays or parallax barriers to achieve different views. In such attempts, however, different video feeds are provided to different components of the display. If as is typical eight to sixteen views are provided, eight to sixteen different sets of sequential video images must be provided.

Thus in these systems as well as in stereography significant costs inure in terms of processing power, time, and storage. In fact, with current technology and for certain particularly complicated shots, hundreds of hours may be required to render a single frame, and multiplying this time for a plurality of alternate viewpoints is prohibitive.

In stereography, re-projection techniques have been developed to reuse pixel color values, rendered for one eye, for the other eye in another view, by mapping the same to an appropriate point for the other view as determined by the scene geometry including the desired intraocular distance, and thus creating a 3D image. In one such technique, from a depth map a mesh is created and the mesh is rendered in a rendering package. The depth map is polygonalized from the point of view of the camera that rendered the depth map, and UV coordinates are assigned to the mesh. The mesh is then textured, and subsequently the mesh can then be rendered from any other point of view or viewing angle, e.g., for a different view or eye for a stereographic image.

However, such current re-projection techniques are slow and can lead to undesirable results.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Systems and methods according to principles described here allow for the rapid creation of multiple novel views for applications. These multiple views may allow for not only stereo views but also for different viewpoints of a stereographic scene to be presented, or for a time progression of the stereo scene to be presented, where a viewpoint is altered with respect to time. The systems and methods may be employed to create the content for auto-stereographic displays or multiple view systems that use a plurality of novel views to display stereo media. Such displays or multiple view systems may include those employing parallax barriers or lenticular lenses.

In one aspect, the invention is directed towards a system for creating a multiple-view display, including: an input module for receiving a computer-generated image of a scene, the computer-generated image including at least depth information about the scene; a re-projection module for creating a plurality of alternate images corresponding to different views of the scene, where the image and alternate images are such that a viewer observing the image and one of the plurality, or two of the plurality, perceives a view of the scene as a three-dimensional scene; and a storage module for storing the image and the plurality of images.

Implementations of the invention may include one or more of the following. The image may be from a video file, from a game engine, or the like. The re-projection module may select a location for the alternate image, create a disparity map indicating differences between the image and the alternate image, create a distortion map indicating pixel transforms based on the disparity map, and create the alternate image by applying the distortion map to the pixels of the image. The re-projection module may further: apply a custom adaptive sharpening filter to one or more objects in the alternate image, the custom adaptive sharpening filter configured to increase a prevalence of high-frequency components and decrease a prevalence of low-frequency components; or for one or more objects in the image, the one or more objects surrounded by a background or clipping plane, temporarily extend the object's size by 1-10 pixels whereby when re-projection occurs, pixels in the object are mapped properly during re-projection and not extended back to the background or clipping plane.

In another aspect, the invention is directed towards a method for creating a multiple-view display, including: receiving a computer-generated image of a scene, the computer-generated image having information including at least depth information; using a step of re-projection, generating a plurality of alternate images, the alternate images corresponding to different views of the scene, where the image and alternate images are such that a viewer observing the image and one of the plurality, or two of the plurality, perceives a view of the scene as a three-dimensional scene; and storing the image and the alternate images corresponding to the different views of the scene.

Implementations of the invention may include one or more of the following. The plurality may number from two to sixteen. For example, the plurality may include eight images, four on one side of the image and four on an opposite side of the image. Each set of four may be equi-angularly spaced from the image. The step of re-projection may include calculating a view of the scene from a different angle. In addition, the step of re-projection may include: selecting a location for the alternate image; creating a disparity map indicating differences between the image and the alternate image; creating a distortion map indicating pixel transforms based on the disparity map; and creating the alternate image by applying the distortion map to the pixels of the image. The step of re-projection may further include performing one or both of the following steps: applying a custom adaptive sharpening filter to one or more objects in the alternate image, the custom adaptive sharpening filter configured to increase a prevalence of high-frequency components and decrease a prevalence of low-frequency components; or for one or more objects in the image, the one or more objects surrounded by a background or clipping plane, temporarily extending the object's size by 1-10 pixels whereby when re-projection occurs, pixels in the object are mapped properly during re-projection and not extended back to the background or clipping plane.

In yet another aspect, the invention is directed towards multiple-view display, including: an input module for receiving a data file, the data file including multiple sets of images corresponding to various views of a scene, each set corresponding to a geographic area on a display screen, each member of each set corresponding to a different view of the scene as displayed at the geographic area, at least one member of each set developed by a step of re-projection of an original image, the original image including at least depth information about the scene; a display module to display each set at its corresponding geographic area, and to display each member of the set within the area; and a directional viewing system disposed adjacent the display module, the directional viewing system configured to direct a view of each member substantially at a given angle relative to the plane of the geographic area.

Implementations of the invention may include one or more of the following. The directional viewing system may be a lenticular display or a parallax barrier. The given angle may be different for each member of a set. Corresponding members of sets may direct views at a common angle relative to the plane of the geographic area. The directional viewing system may be configured to direct views at between two and sixteen different angles. The geographic area may be a line of display. The geographic area may be in the shape of a rectangle. Each member of the set may be created by re-projection by selecting a location for the member of the set, creating a disparity map indicating differences between the original image and an image corresponding to the member of the set at the location, creating a distortion map indicating pixel transforms based on the disparity map, and creating the image corresponding to the member of the set at the location by applying the distortion map to the pixels of the original image. The image corresponding to the member of the set may be further created by: applying a custom adaptive sharpening filter to one or more objects in the image corresponding to the member of the set, the custom adaptive sharpening filter configured to increase a prevalence of high-frequency components and decrease a prevalence of low-frequency components; or for one or more objects in the original image, the one or more objects surrounded by a background or clipping plane, temporarily extending the object's size by 1-10 pixels whereby when re-projection occurs, pixels in the object are mapped properly during re-projection and not extended back to the background or clipping plane.

In a further aspect, the invention is directed towards a data file, the data file including multiple sets of images corresponding to various views of a scene, each set corresponding to a geographic area on a display screen, each member of each set corresponding to a different view of the scene as displayed at the geographic area, at least one member of each set developed by a step of re-projection of an original image, the original image including at least depth information about the scene.

Implementations of the invention may include one or more of the following. The geographic area is a vertical line of display and may be in the shape of a rectangle. Each member of the set may be created by re-projection by selecting a location for the member of the set, creating a disparity map indicating differences between the original image and an image corresponding to the member of the set at the location, creating a distortion map indicating pixel transforms based on the disparity map, and creating the image corresponding to the member of the set at the location by applying the distortion map to the pixels of the original image. The image corresponding to the member of the set may be further created by: applying a custom adaptive sharpening filter to one or more objects in the image corresponding to the member of the set, the custom adaptive sharpening filter configured to increase a prevalence of high-frequency components and decrease a prevalence of low-frequency components; or for one or more objects in the original image, the one or more objects surrounded by a background or clipping plane, temporarily extending the object's size by 1-10 pixels whereby when re-projection occurs, pixels in the object are mapped properly during re-projection and not extended back to the background or clipping plane.

Advantages of certain implementations of the invention may include one or more of the following. Certain systems and methods of creating a novel view from an existing image can be performed without creating or rendering geometry and therefore are faster than previous techniques. The results of such systems may be employed to provide image data for multiple view displays, including lenticular displays and those employing parallax barriers. Other advantages will be apparent to one of ordinary skill in the art, given the description that follows, including the figures and claims.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 9 illustrates a schematic depiction of a multiple view display, in which multiple views are evident in two viewing dimensions.

Like reference numerals refer to like elements throughout. Elements are not drawn to scale unless otherwise noted.

DETAILED DESCRIPTION

This specification incorporates by reference herein U.S. patent application Ser. No. 13/649,788, filed Oct. 11, 2012, entitled "SYSTEM AND METHOD FOR REDUCING ARTIFACTS CAUSED BY VIEW DEPENDENT LIGHTING COMPONENTS", owned by the assignee of the present application.

Prior to the description of re-projection in the creation of data for multiple view displays, an exemplary method of re-projection is discussed in simplified fashion here.

Figure 1:
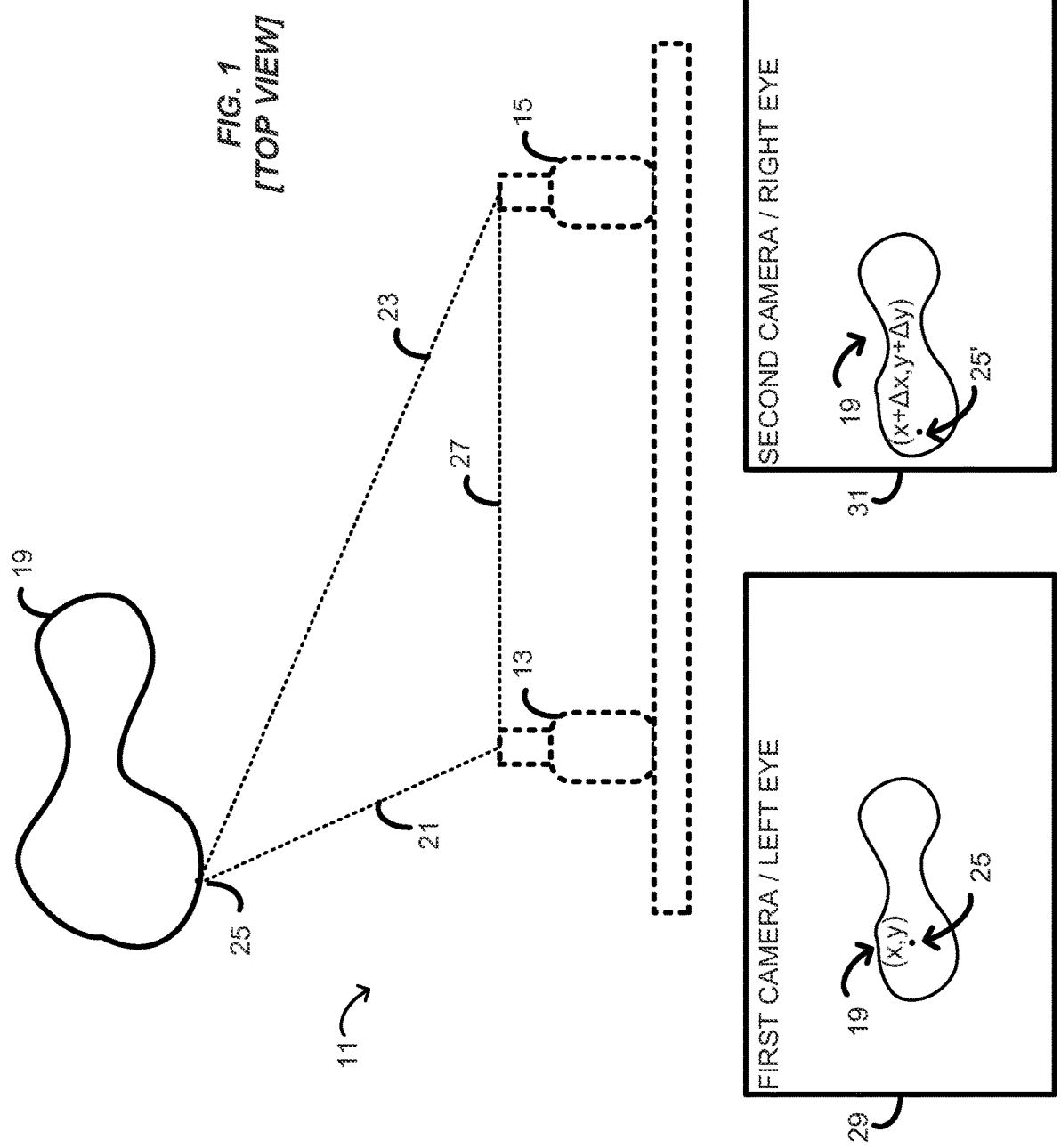
FIG. 1 illustrates a set of virtual stereo cameras imaging an object, as well as a view from each of the respective cameras.

FIG. 1 illustrates a schematic depiction of an exemplary system 11 for a fast re-projection technique. In FIG. 1, a first stereo camera 13 images an object 19, and an exemplary point 25 on the object is illustrated with a ray 21 extending between the point 25 and the camera 13. The intent of re-projection is to obtain a pixel color value for the point 25 as seen by a second stereo camera 15 without having to perform a lengthy rendering process. In essence, re-projection "re-uses" the pixel value as calculated for the left eye for the right eye. In the scenario of FIG. 1, as long as the location of the camera for the new view is known, and so long as the distance of the object 19 from a viewing plane (also termed the "camera plane") of one or both cameras is known, the location of the point 25 for a viewing plane of the second camera 15, and in particular its pixel color value, can be calculated. A ray indicating point 25 on the viewing plane of the second camera is shown by the ray 23.

Knowing depths allows the creation of a depth map. A depth map is a map of a depth value for every pixel (x,y), and the depth is the distance from the camera plane to the point being imaged by the pixel, e.g., a character, an object, a clipping plane, "infinity" (which is generally indicated as an arbitrary high number for depth), or the like. The depth map may be a rendered image that is calculated at the same time as the color image, where depth is an arbitrary output variable or AOV. The depth may be indicated in whatever units the rendered scene is in, e.g., centimeters.

Referring back to FIG. 1, also illustrated our views or viewing planes 29 and 31 for the first and second cameras, respectively. These illustrate where the point 25 from the left eye is transformed in space if applied to the right eye. In views 29 and 31, the point 25 at location (x,y) is transformed such that the same point appears in the second camera at (x+Δx,y+Δy), indicated by point 25'. In other words, the system has calculated a Δx and Δy for the pixel. If such is calculated for each pixel in the image, a disparity map is created, which indicates how many pixels are required for a translation, generally in the X and Y directions, to obtain a pixel color value from a point in a first camera, i.e., a point on a first viewing plane, to obtain where the color value should be placed in the second viewing plane. Every pixel from an original camera view can be mapped to a pixel in a new camera view. For example, a disparity map may indicate that a horizontal translation of 1.8 pixels is required to obtain views for a second camera relative to a first camera. In other examples, some pixels may move entirely off the screen and thus be unseen by the second camera, particularly where objects are very close to the first camera.

The calculated disparity map may then be employed to create a distortion map. The distortion map indicates information about what pixel information may be accessed in the original or first view to obtain a color value for a point in the new or second view. The distortion map then acts as a guide for what pixel in the first view should be accessed to obtain a color value for pixel in the second view. So if the pixel color value is translated by 100 pixels, and the original was at (0,0), the new would be (100,0). The distortion map, created in the space of the second view, is used as a look up from the second view to the first view.

In essence re-projection desirably "re-uses" pixel color values from the first camera view, negating the need to perform a rendering step to obtain values for the second camera view. Such reuse results in significant computational savings.

Re-projection requires depth information (as well as an (x,y) location) for each pixel to be re-projected. If an image from a live-action shot is employed, in many cases such depth information will be lacking. Cameras exist, however, which to a certain extent can obtain depth information from the objects imaged. Moreover, it is envisioned, and within the scope of the principles disclosed here, to employ live-action cameras that are even more enhanced and can obtain depth information for most if not all objects in a shot e.g., employing range imaging. This depth information for each pixel could be conveniently employed in certain methods disclosed here to create a second image for stereo photography.

Figure 2:
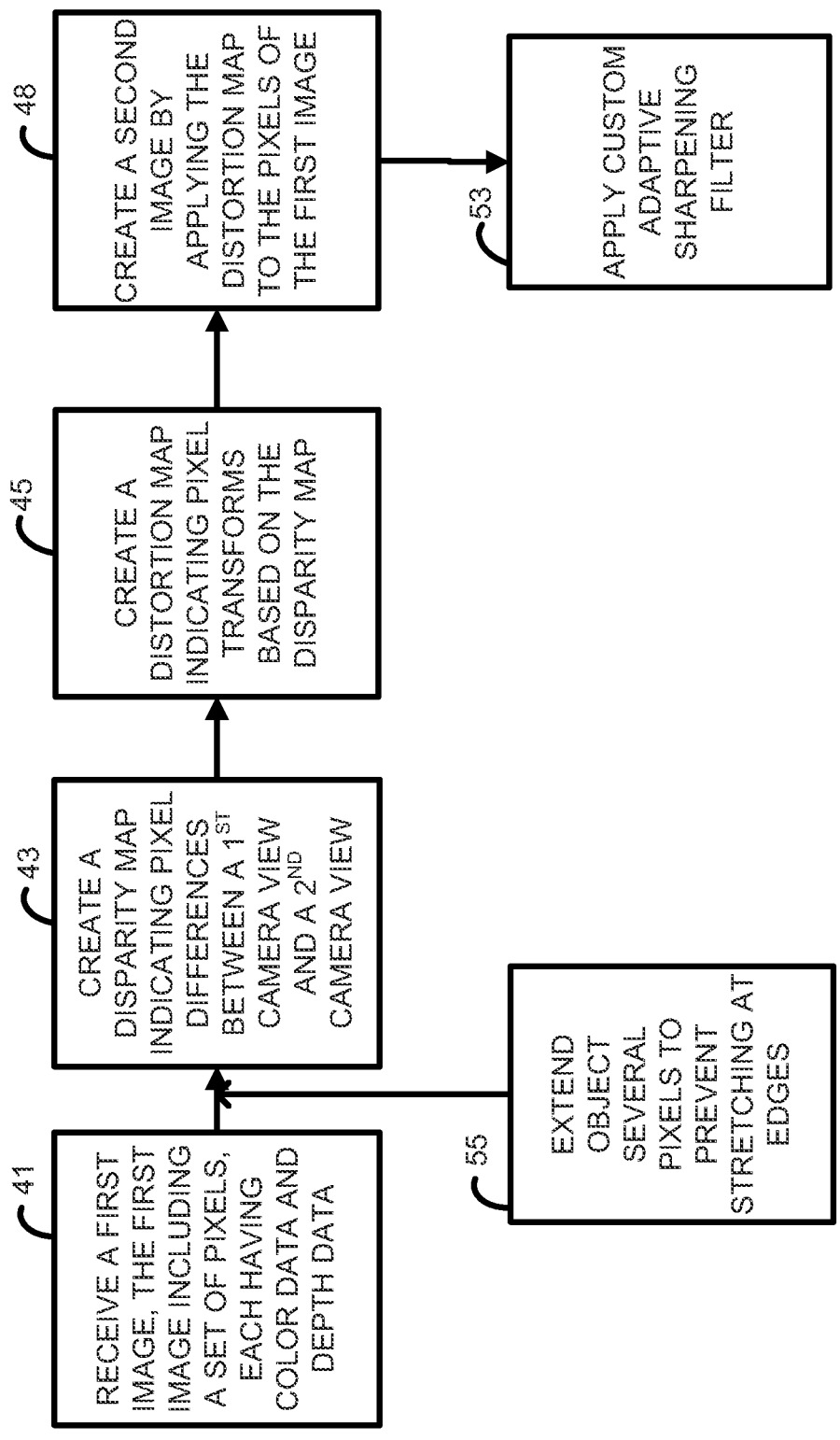
FIG. 2 is a flowchart of a method of re-projection according to the principles disclosed here.

FIG. 2 is a flowchart 39 of a method according to these principles. In a first step, a first image is received, the first image including a set of pixels, each having color data, depth data, and a location in the viewing plane (step 41).

In one optional implementation, a step may then be performed to extend the edges around the perimeter of certain objects (step 55), e.g., objects surrounded by backgrounds where the backgrounds are far away such as at "infinity" or a clipping plane. The reason is that a deleterious artifact of re-projection of such objects is that occasionally edge pixels may be stretched back to the background. By extending the object a few pixels in all directions, beyond its prior perimeter in the calculation, such artifacts are reduced because pixels are carried around the object as the view is changed, not allowing an edge to be pulled back to the clipping plane. In other words, the incoming depth data is 'modified' to extend the edges of the object, to help prevent stretching. A suitable number of pixels may be, e.g., 1 to 10 pixels distance away from the original edge of the object.

A next step is to create a disparity map indicating pixel differences between a first camera view and a second camera view (step 43). A next step is to create a distortion map indicating pixel transforms based on the disparity map (step 45). Essentially, the distortion map provides a recipe for creating pixel color values in the new or second view from those in the original. Finally, a second image may be created by applying the distortion map to the pixels of the first image (step 48).

Various steps may also be performed before, during, or after the re-projection. One exemplary step is the application of a custom adaptive sharpening filter (step 53). Such a custom adaptive sharpening filter can cause an emphasis of high-frequency components and a decrease of prevalence of low-frequency components. In more detail, when performing the re-projection, i.e., looking up new pixel values from original ones, on occasion an interpolation will have to be performed between two original pixels. If the system was designed to simply average the color values, a softening of the result would occur, and the same may in some cases be undesirable for particular effect. A lookup may be configured to use a kernel that attempts to preserve high-frequency detail.

Put another way, re-projection causes a mapping, and such mapping inherently involves resampling. Resampling usually causes a level of aliasing effects, and aliasing effects are generally pronounced at high-frequency areas. Thus, such a filter, which includes negative lobes, will reduce such aliasing effects and results in a higher-quality image.

Figure 3:
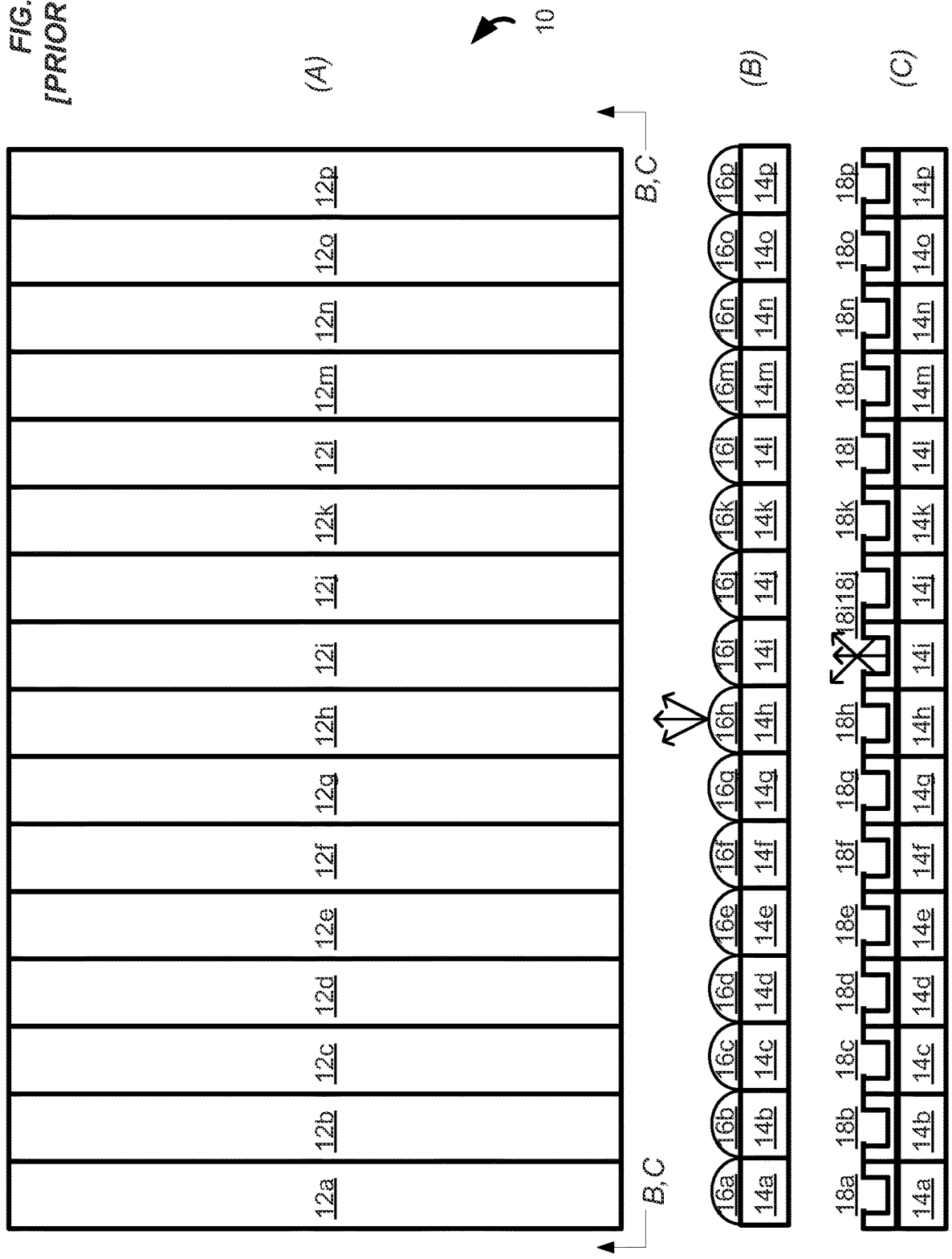
FIG. 3(A) illustrates a schematic depiction of a multiple view display.
FIGS. 3(B) and 3(C) illustrate side views of the display of FIG. 3(A), illustrating different ways of enabling multiple views.

FIG. 3(A) illustrates a view of an exemplary prior art lenticular or parallax barrier display 10. In the display 10, a set of views are provided within each column of the display, the columns being enumerated 12a, 12b, 12c, and so on. For a standard 9-view display, nine views would be provided in the set.

The views are distinguished in some fashion. For example, referring to FIG. 3(B), a directional viewing system including a set of image dispersion components 16a, 16b, 16c, and so on, are provided to direct images from respective image display components 14a, 14b, 14c, and so on, into various directions. For example, the first image from each set may be directed at one angle, the second image from the set at a different angle, and so on.

Systems and methods according to principles disclosed here are not limited solely to lenticular lenses. Referring to FIG. 3(C), systems may be devised in which inner surfaces of open grooves on the display surface are preferentially viewed from different viewpoints or angles. In FIG. 3(C), such systems are illustrated by respective image dispersion components 18a, 18b, 18c, and so on. Other image dispersion systems may also be used, including those employing parallax barriers. No matter how the images are dispersed, such displays are referred to herein as multiple view displays.

Figure 4:
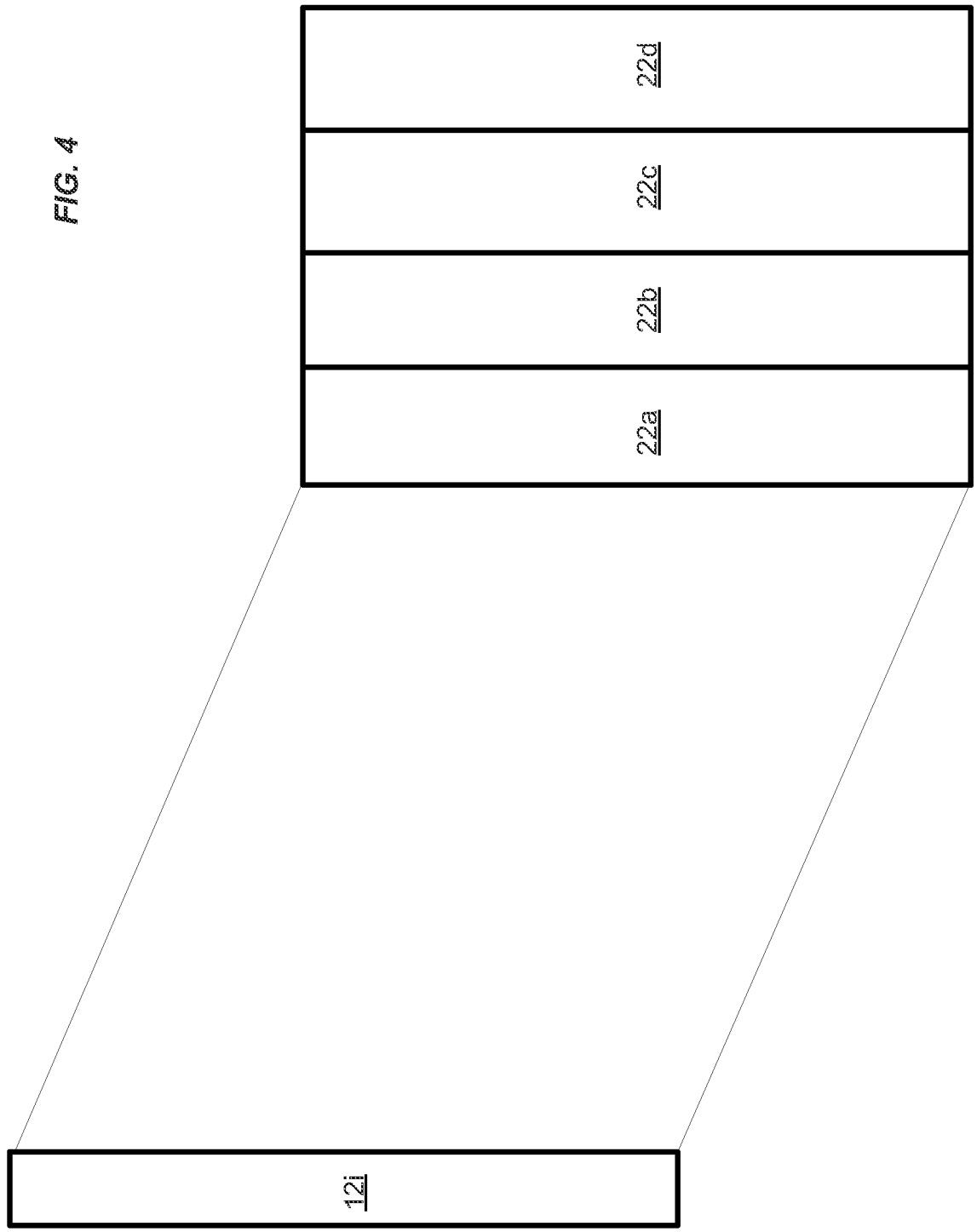
FIG. 4 illustrates how a column of the display of FIG. 3(A) is constituted of images for multiple displays, in this case, for four different views.

FIG. 4 illustrates in more detail how a particular column 12i, i.e., a set of images, may exhibit multiple images 22a, 22b, 22c, and 22d. In FIG. 4, four views are illustrated, but it will be understood to one of ordinary skill in the art that this number may vary. In some cases, just two views may be created, while in more complicated situations sixteen or more views may be created.

Figure 5:
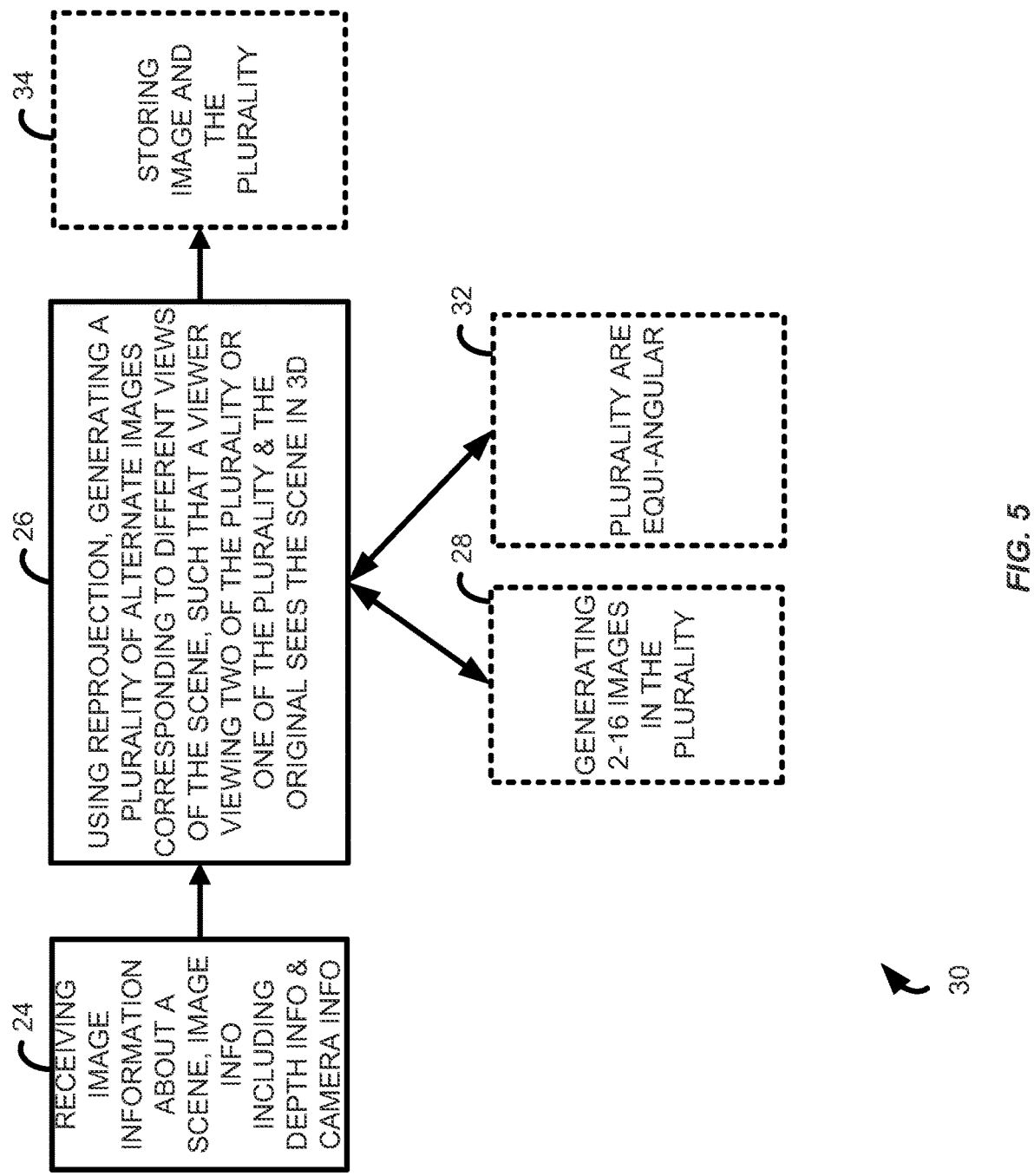
FIG. 5 illustrates a flowchart of a method according to principles disclosed here.

FIG. 5 illustrates a flowchart 30 of a method according to principles disclosed here. A first step is receiving image information about a scene (step 24). The image information may include depth information as well as information about camera location. A next step is a generation of a plurality of alternate images corresponding to different views of the scene (step 26). This generation generally takes advantage of the re-projection technique noted above. The image and plurality of alternate images may be such that the user viewing the image and one of the alternate images, or two of the alternate images, is presented with a stereo pair, and thus views the scene in 3-D. Such occurs because the separation of the viewer's eyes may be great enough that the left eye views one image and the right eye views another. It is noted that this differs from standard stereo photography. For example, in standard stereo photography, no matter from which position one views the scene, one sees the same scene. In the multiple view system according to principles disclosed here, such is not the case. Rather, one's position or location with respect to the display is highly influential in the scene one views, i.e., one may see a very different 3-D image from location to location, although generally one will see an image in 3-D from any arbitrary viewable position.

The images in the plurality may be of any number, but generally two to sixteen images may be generated (step 28). In many cases, the plurality of images and thus plurality of angles are caused to be equiangular (step 32). In other words, if the display if such that discrete image changes occur as one's view is panned across the display, then the viewing changes may be configured to occur at equal increments in the viewing angle.

A final step of the flowchart 30 is to store the image and the plurality of alternate images (step 34). This step is optional, or may be highly transitory. For example, after creation of the plurality of alternate images, the same may be displayed on a multiple view display and not saved.

Figure 6:
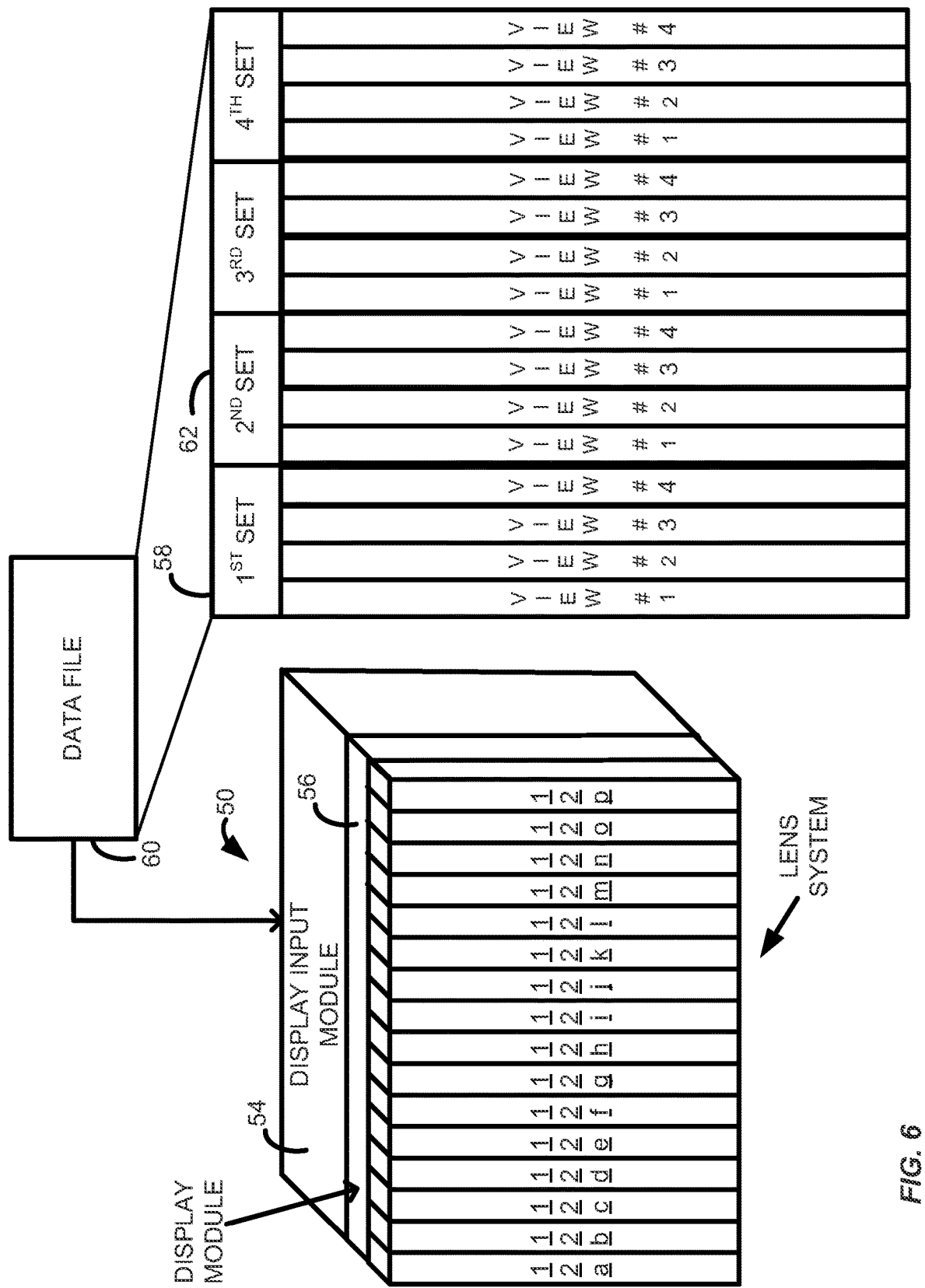
FIG. 6 illustrates the structure of the data file being employed to provide input to a multiple view system.

For example, referring to FIG. 6, a data file 60 may be composed of a number of sets of images, e.g., a first set 58, a second set 62, and so on. Each set incorporates multiple views, i.e., alternate images, though of course one of the views may be the original image. The different sets may be developed at least partially by a step of re-projection. The data file 60 may be sent to a display input module 54 on a display 50. The display input module 54 may perform any needed functionality prior to display of the sets and various views using a display module 56 and dispersion of views of the multiple images through the dispersion components 12a-12p, e.g., lenticular lenses (it will be understood in an actual system that many more columns of dispersion components will generally be employed).

Figure 7:
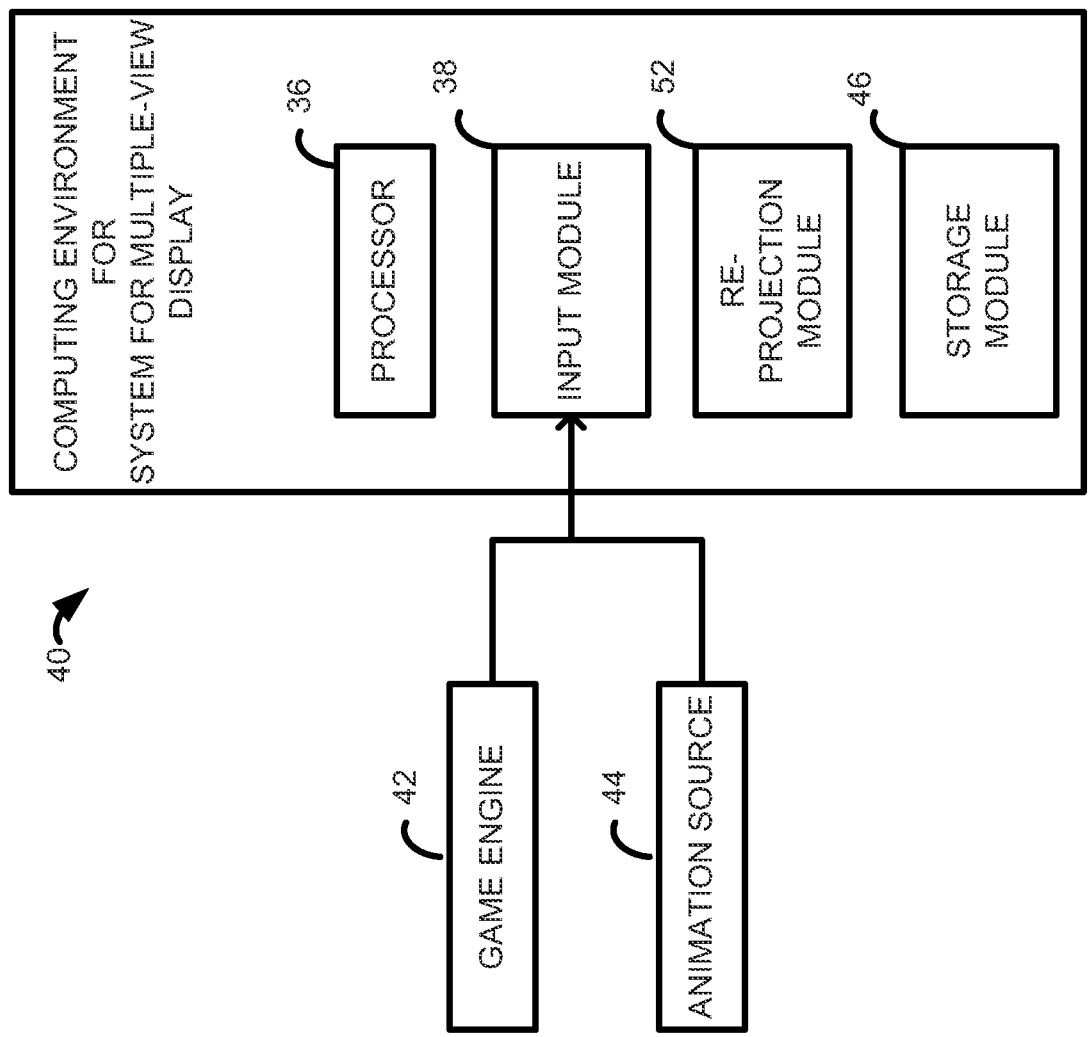
FIG. 7 illustrates a modular computing environment of the system according to principles disclosed here.

FIG. 7 illustrates a modular computing environment 40 for a system for multiple view displays. The computing environment 40 includes a processor 36 which may process instructions provided to it from the other modules. An input module 38 may be employed to buffer and perform preprocessing on data received, e.g., from a source of an animation or other video file 44, a game engine 42, or the like. A re-projection module 52 causes alternate images to be created from the received data in a manner as noted above. The resulting alternate images, as well as the original image, may be caused to be stored by a storage module 46.

Figure 8:
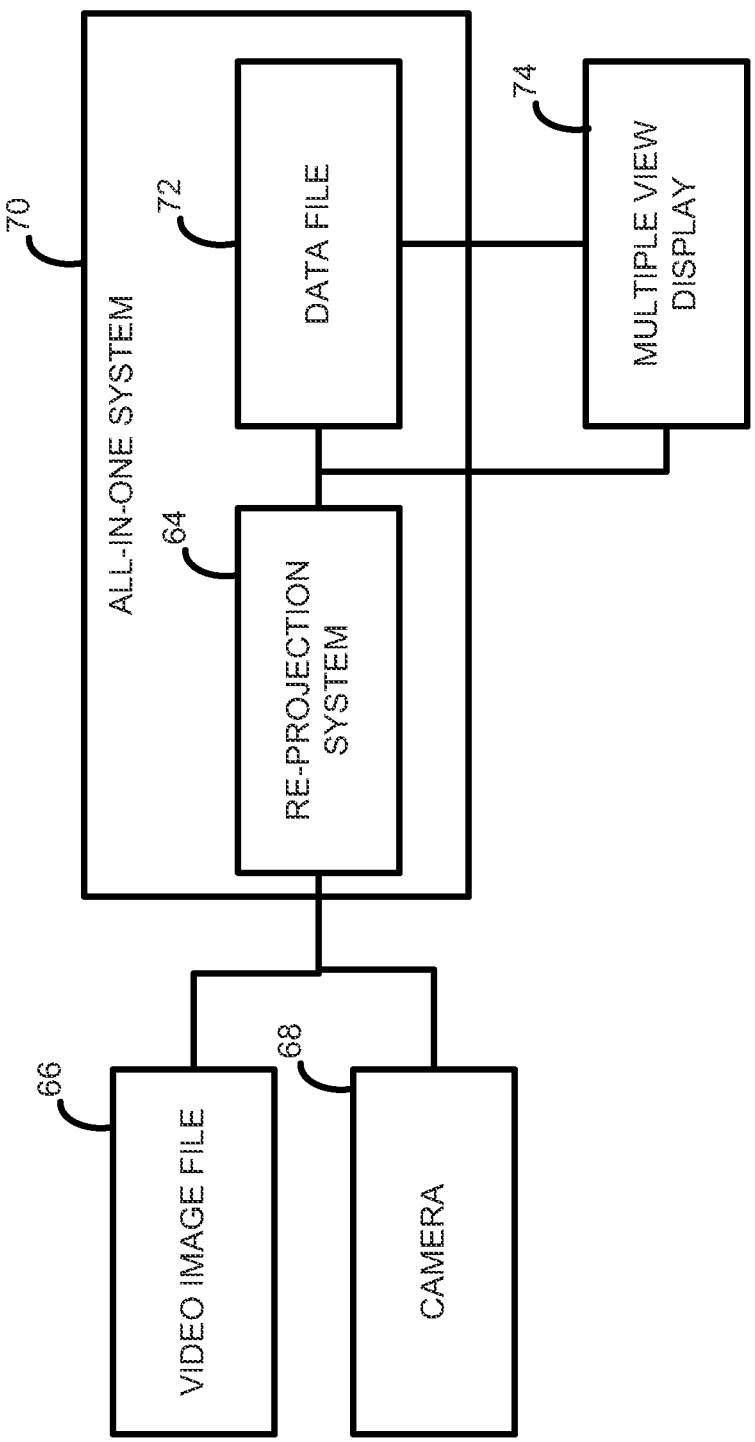
FIG. 8 illustrates another computing environment of the system according to principles disclosed here in which a raw video file or video feed from a camera may be input to the system and caused to provide a multiple view output.

FIG. 8 illustrates an all-in-one system 70 for creation of sets of alternate images for multiple view displays. The system 70 includes a re-projection system 64 which performs the re-projection algorithm described above. The re-projection system 64 may take as an input a video image file 66 or, e.g., a direct video feed from a camera 68, so long as the video image file or camera data is able to provide depth information to allow the re-projection algorithm to operate. The result of the re-projection algorithm may be sent to a data file 72, and subsequently sent to a display 74. Alternatively, the result may be sent directly to the display. It will be understood that in some cases the display 74 may also be integrated into the system 70, and in particularly compact systems the camera 68 may as well.

Figure 9:
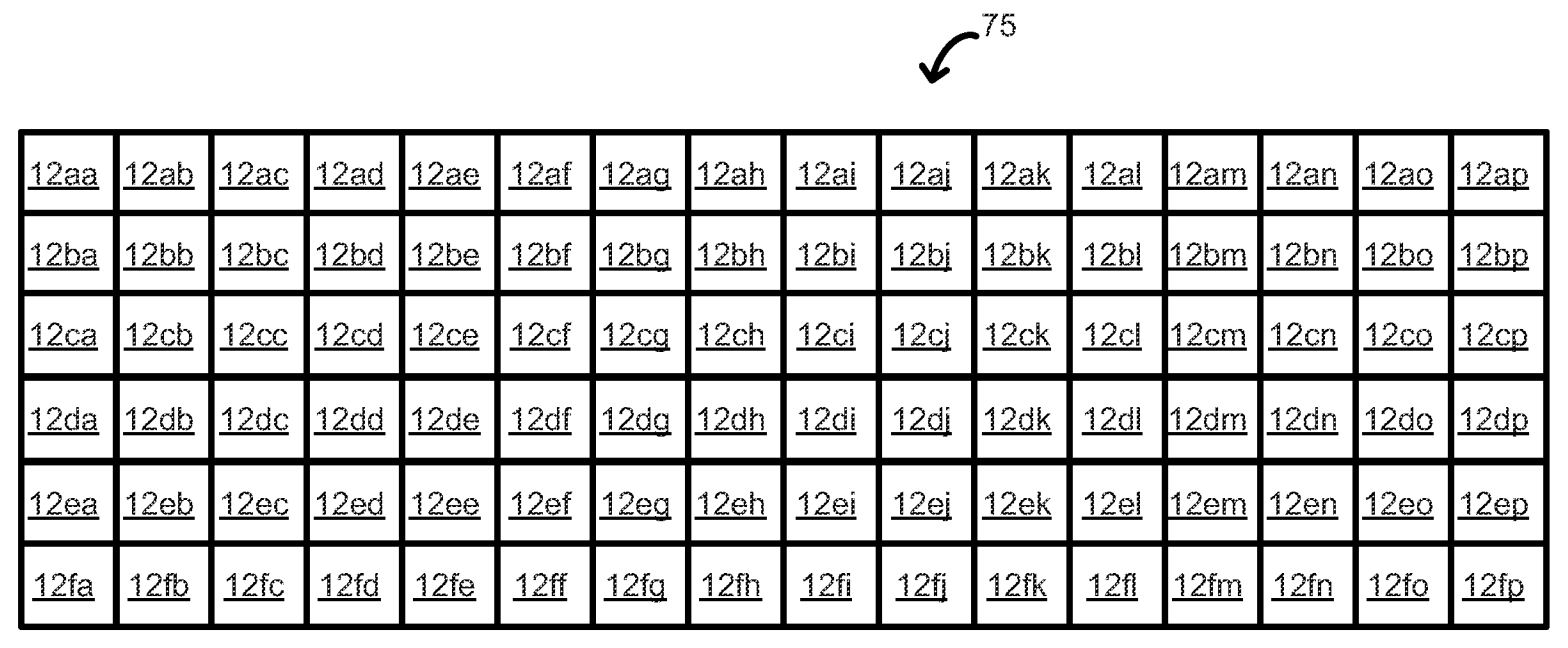

FIG. 9 illustrates an alternative implementation of a multiple view display 75. While generally multiple view displays are formed of columns in recognition of the usual horizontal orientation of a viewer's eyes, in some implementations images may also be caused to vary from top to bottom, i.e., may change as the viewing angle changes in a vertical pan. While generally less useful in current systems, the same may be employed in specialized implementations to achieve a desired purpose.

What has been described are systems and methods for creating images for multiple view displays, particularly to allow stereo images to be presented to a viewer for three-dimensional viewing. The images may be created using a step of fast re-projection, enabling not only rapid conversion of 2D footage to stereo but even on-the-fly creation of multiple view content, e.g., for live events, video games, or the like.

One implementation includes one or more programmable processors and corresponding computer system components to store and execute computer instructions, such as to provide the tools for creating multiple view displays. Such a computing environment is disclosed below.

Figure 10:
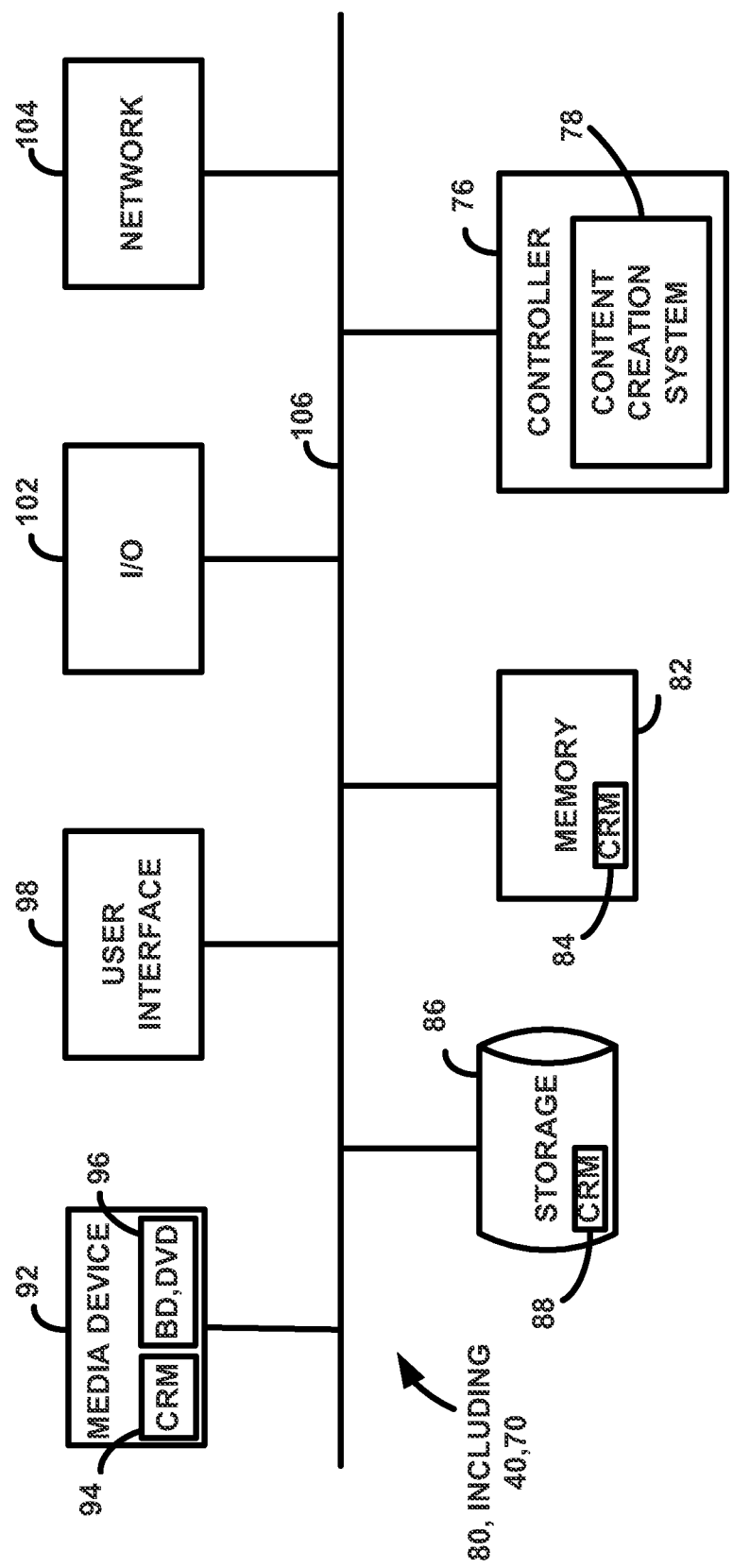
FIG. 10 is a schematic depiction of the computing environment in which the systems and methods according to principles disclosed here may be implemented.

Referring to FIG. 10, a representation of an exemplary computing environment 80 for an animation workstation is illustrated.

The computing environment 80 includes a controller 76, a memory 82, storage 86, a media device 92, a user interface 98, an input/output (I/O) interface 102, and a network interface 104. The components are interconnected by a common bus 106. Alternatively, different connection configurations can be used, such as a star pattern with the controller at the center.

The controller 76 includes a programmable processor and controls the operation of an content creation system 78. The controller 76 loads instructions from the memory 82 or an embedded controller memory (not shown) and executes these instructions to control the system.

Memory 82, which may include non-transitory computer-readable memory 84, stores data temporarily for use by the other components of the system. In one implementation, the memory 82 is implemented as DRAM. In other implementations, the memory 82 also includes long-term or permanent memory, such as flash memory and/or ROM.

Storage 86, which may include non-transitory computer-readable memory 88, stores data temporarily or long-term for use by other components of the system, such as for storing data or instructions. In one implementation, the storage 86 is a hard disc drive or a solid state drive.

The media device 92, which may include non-transitory computer-readable memory 94, receives removable media and reads and/or writes data to the inserted media. In one implementation, the media device 92 is an optical disc drive or disc burner, e.g., a writable Blu-ray® disc drive 96.

The user interface 98 includes components for accepting user input, e.g., the user indication of video files, viewing angles, or other aspects discussed above, and presenting a display, e.g., of stereo output images where the stereo aspect arises from a viewer's eyes viewing different angles of the scene. In one implementation, the user interface 98 includes a keyboard, a mouse, audio speakers, and a display. The user interface may further include a lenticular or other multiple view display. The controller 76 uses input from the user to adjust the operation of the computing environment.

The I/O interface 102 includes one or more I/O ports to connect to corresponding I/O devices, such as external storage or supplemental devices, e.g., cloud storage devices, a printer or a PDA. In one implementation, the ports of the I/O interface 102 include ports such as: USB ports, PCM-CIA ports, serial ports, and/or parallel ports. In another implementation, the I/O interface 102 includes a wireless interface for wireless communication with external devices. These I/O interfaces may be employed to connect to one or more content playback devices.

The network interface 104 allows connections with the local network and includes a wired and/or wireless network connection, such as an RJ-45 or Ethernet connection or "Wi-Fi" interface (802.11). Numerous other types of network connections will be understood to be possible, including WiMax, 3G or 4G, 802.15 protocols, 802.16 protocols, satellite, Bluetooth®, or the like.

The system may include additional hardware and software typical of such devices, e.g., power and operating systems, though these components are not specifically shown in the figure for simplicity. In other implementations, different configurations of the devices can be used, e.g., different bus or storage configurations or a multi-processor configuration.

Various illustrative implementations of the present invention have been described. However, one of ordinary skill in the art will recognize that additional implementations are also possible and are within the scope of the present invention. For example, the disclosed systems and methods can be applied to images from movies, television, video games, etc.

Systems and methods according to present principles may be applied to numerous types of displays, including those besides lenticular or parallax barriers. In addition, it is noted that, given progress in development of computational 3D displays, 3D displays will improve with time and will not just be limited to special screens like lenticular screens or parallax barriers. Display technologies will change over time, and this includes the type of display, the kinds of computation, the data formats that the same will use, etc. Accordingly, the scope of the invention goes well beyond lenticular displays and indeed can include any display technology which introduces reprojection between the media input and the display. Thus, the invention may be employed as a computational tool in any display as the same evolve.

Moreover, besides significant savings in bandwidth, display quality may be increased because, rather than using a stream of, e.g., eight video viewpoints, one could compute, e.g., 20 to 30 or even more viewpoints, making the change in viewpoints seamless, if as noted above the display technology matures to computationally allow the same.

Accordingly, the present invention is not limited to only those implementations described above.

The invention claimed is:

1. A system for creating a multiple-view display, comprising:
   an input module for receiving a computer-generated image of a scene and depth information about the scene, wherein the depth information is generated by a camera and is distinct from the computer-generated image;
   a re-projection module for creating a plurality of alternate images corresponding to different views of the scene using the computer-generated image and the depth information, wherein the computer-generated image and plurality of alternate images are such that a viewer observing the computer-generated image and one of the plurality, or two of the plurality, perceives a view of the scene as a three-dimensional scene, wherein the re-projection module further applies a custom adaptive sharpening filter to one or more objects in the alternate image, the custom adaptive sharpening filter configured to increase a prevalence of high-frequency components and decrease a prevalence of low-frequency components; and
   a storage module for storing the computer-generated image and the plurality of images.

2. The system of claim 1, wherein the image is from a video file.

3. The system of claim 1, wherein the image is received from a game engine.

4. The system of claim 1, wherein the re-projection module selects a location for the alternate image, creates a disparity map indicating differences between the image and the alternate image, creates a distortion map indicating pixel transforms based on the disparity map, and creates the alternate image by applying the distortion map to the pixels of the image.

5. The system of claim 4, wherein the re-projection module further:
   for one or more objects in the image, the one or more objects surrounded by a background or clipping plane, temporarily extends the object's size by 1-10 pixels whereby when re-projection occurs, pixels in the object are mapped properly during re-projection and not extended back to the background or clipping plane.

6. A method for creating a multiple-view display, comprising:
   receiving a computer-generated image of a scene, and depth information about the scene, wherein the depth information is generated by a camera and is distinct from the computer-generated image;
   using a step of re-projection, (i) generating a plurality of alternate images using the computer-generated image and the depth information, the alternate images corresponding to different views of the scene, wherein the computer-generated image and alternate images are such that a viewer observing the computer-generated image and one of the plurality, or two of the plurality, perceives a view of the scene as a three-dimensional scene and (ii) applies a custom adaptive sharpening filter to one or more objects in the alternate image, the custom adaptive sharpening filter configured to increase a prevalence of high-frequency components and decrease a prevalence of low-frequency components; and storing the computer-generated image and the alternate images corresponding to the different views of the scene.

7. The method of claim 6, wherein the plurality numbers from two to sixteen.

8. The method of claim 7, wherein the plurality includes eight images, four on one side of the image and four on an opposite side of the image.

9. The method of claim 8, wherein each set of four are equi-angularly spaced from the image.

10. The method of claim 6, wherein the step of re-projection includes calculating a view of the scene from a different angle.

11. The method of claim 10, wherein the step of re-projection includes:
selecting a location for the alternate image;
creating a disparity map indicating differences between the image and the alternate image;
creating a distortion map indicating pixel transforms based on the disparity map; and
creating the alternate image by applying the distortion map to the pixels of the image.

12. The method of claim 11, wherein the step of re-projection further includes performing one or both of the following steps:
applying a custom adaptive sharpening filter to one or more objects in the alternate image, the custom adaptive sharpening filter configured to increase a prevalence of high-frequency components and decrease a prevalence of low-frequency components; or
for one or more objects in the image, the one or more objects surrounded by a background or clipping plane, temporarily extending the object's size by 1-10 pixels whereby when re-projection occurs, pixels in the object are mapped properly during re-projection and not extended back to the background or clipping plane.

13. A multiple-view display, comprising:
an input module for receiving a data file, the data file including multiple sets of images corresponding to various views of a scene, each set corresponding to a geographic area on a display screen, each member of each set corresponding to a different view of the scene as displayed at the geographic area, at least one member of each set developed by a step of re-projection of an original image, the original image having associated with it depth information about the scene, wherein the depth information is generated by a camera and is distinct from the original image, the step of re-projection including applying a custom adaptive sharpening filter to one or more objects in the at least one member of each set, the custom adaptive sharpening filter configured to increase a prevalence of high-frequency components and decrease a prevalence of low-frequency components;
a display module to display each set at its corresponding geographic area, and to display each member of the set within the area;
a directional viewing system disposed adjacent the display module, the directional viewing system configured to direct a view of each member substantially at a given angle relative to the plane of the geographic area.

14. The display of claim 13, wherein the directional viewing system is a lenticular display or a parallax barrier.

15. The display of claim 13, wherein the given angle is different for each member of a set.

16. The display of claim 13, wherein corresponding members of sets direct views at a common angle relative to the plane of the geographic area.

17. The display of claim 13, wherein the directional viewing system is configured to direct views at between two and sixteen different angles.

18. The display of claim 13, wherein the geographic area is a line of display.

19. The display of claim 13, wherein the geographic area is in the shape of a rectangle.

20. The display of claim 13, wherein each member of the set is created by re-projection by selecting a location for the member of the set, creating a disparity map indicating differences between the original image and an image corresponding to the member of the set at the location, creating a distortion map indicating pixel transforms based on the disparity map, and creating the image corresponding to the member of the set at the location by applying the distortion map to the pixels of the original image.

21. The display of claim 20, wherein the image corresponding to the member of the set is further created by:
applying a custom adaptive sharpening filter to one or more objects in the image corresponding to the member of the set, the custom adaptive sharpening filter configured to increase a prevalence of high-frequency components and decrease a prevalence of low-frequency components; or for one or more objects in the original image, the one or more objects surrounded by a background or clipping plane, temporarily extending the object's size by 1-10 pixels whereby when re-projection occurs, pixels in the object are mapped properly during re-projection and not extended back to the background or clipping plane.

* * * * *